US011140416B1

(12) United States Patent
Tian et al.

(10) Patent No.: US 11,140,416 B1
(45) Date of Patent: Oct. 5, 2021

(54) METHOD AND APPARATUS FOR TEMPORAL SMOOTHING FOR VIDEO

(71) Applicant: Tencent America LLC, Palo Alto, CA (US)

(72) Inventors: Jun Tian, Palo Alto, CA (US); Wen Gao, West Windsor, NJ (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/095,602

(22) Filed: Nov. 11, 2020

Related U.S. Application Data

(60) Provisional application No. 63/000,292, filed on Mar. 26, 2020.

(51) Int. Cl.
| | |
|---|---|
| *H04N 19/66* | (2014.01) |
| *H04N 19/176* | (2014.01) |
| *H04N 19/80* | (2014.01) |
| *H04N 19/119* | (2014.01) |
| *G06T 5/00* | (2006.01) |

(52) U.S. Cl.
CPC .......... *H04N 19/66* (2014.11); *H04N 19/119* (2014.11); *H04N 19/176* (2014.11); *H04N 19/80* (2014.11); *G06T 5/002* (2013.01); *G06T 5/005* (2013.01); *G06T 2207/20182* (2013.01)

(58) Field of Classification Search
CPC ...... H04N 19/66; H04N 19/119; H04N 19/80; H04N 19/176; G06T 5/005; G06T 5/002; G06T 2207/20182
See application file for complete search history.

(56) References Cited

U.S. PATENT DOCUMENTS

| | | | | |
|---|---|---|---|---|
| 2006/0256872 | A1* | 11/2006 | Esaki | H04N 19/61 375/240.27 |
| 2009/0103617 | A1* | 4/2009 | Au | H04N 19/107 375/240.13 |
| 2012/0128071 | A1* | 5/2012 | Celetto | H04N 19/117 375/240.16 |

OTHER PUBLICATIONS

Xiaojie Sheng et al., "Comparison of depth estimation quaiity between deep learning and image matching based algorithm for 6DoF video". Alibaba Inc., Peking University, No. IEEE1857.9_M1159; AVSVR_M1159, 20th Meeting: Shenzhen, China, Dec. 6, 2019 (3 pages).

Xiaojie Sheng et al., "The subjective quality analysis and comparison between DIBR and IBR based algorithm", Alibaba Inc., No. IEEE1857.9_M1160; AVSVR_M1160, 20th Meeting: Shenzhen, China, Dec. 6, 2019 (3 pages).

(Continued)

*Primary Examiner* — Richard T Torrente
(74) *Attorney, Agent, or Firm* — Oblon, McClelland, Maier & Neustadt, L.L.P.

(57) ABSTRACT

Aspects of the disclosure provide methods and apparatuses for video processing. In some examples, an apparatus for video processing includes processing circuitry. For example, processing circuitry determines a frame interval for a current block in a current frame within a sequence of frames. The frame interval indicates a group of frames in the sequence of frames with collocated blocks of the current block that satisfy an error metric requirement comparing to the current block. Further, the processing circuitry determines a replacement block based on the collocated blocks in the group of frames, and replaces the current block in the current frame with the replacement block.

12 Claims, 6 Drawing Sheets

(56) References Cited

OTHER PUBLICATIONS

Jill Boyce et al., "Working Draft 3 of Metadata for Immersive Video", International Organisation for Standardisation Organisation Internationale De Normalisation ISO/IEC JTC1/SC29/WG11 Coding of Moving Pictures and Audio, ISO/IEC JTC1/SC29/WG11 MPEG2018/M18794, Geneva, CH, Oct. 2019 (49 pages).

Source: Requirements, "Call for Proposals on 3DoF+ Visual", International Organization for Standardization Organisation Internationale De Normalisation ISO/IEC JTC1/SC29/WG11 Coding of Moving Pictures and Audio, ISO/IEC JTC1/SC29/WG11 MPEG/N18145, Marrakesh, MA, Jan. 2019 (18 pages).

Source: Video, "Test Model 3 for Immersive Video", International Organization for Standardization Organisation Internationale De Normalisation ISO/IEC JTC1/SC29/WG11 Coding of Moving Pictures and Audio, ISO/IEC JTC 1/SC29/WG 11 N18795, Geneva, CH, Nov. 8, 2019 (37 pages).

David Bartovtak et al., "Video Denoising Based on Adaptive Temporal Averaging", Engineering Review vol. 32, Issue 2, pp. 64-69, 2012 (6 pages).

\* cited by examiner

METHOD AND APPARATUS FOR TEMPORAL SMOOTHING FOR VIDEO

INCORPORATION BY REFERENCE

This present disclosure claims the benefit of priority to U.S. Provisional Application No. 63/000,292, "BLOCK-BASED TEMPORAL SMOOTHING FOR VIDEO" filed on Mar. 26, 2020, which is incorporated by reference herein in its entirety.

TECHNICAL FIELD

The present disclosure describes embodiments generally related to video smoothing techniques.

BACKGROUND

The background description provided herein is for the purpose of generally, presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Immersive video includes views from multiple directions and can be rendered to provide special user experience. In an example, the immersive video is recorded as video recordings from multiple directions at the same time, using an omnidirectional camera or a collection of cameras. During a playback on normal flat display, the viewer has a control of the viewing direction like a panorama. In another example, in a virtual reality application, computer technologies create immersive video that replicate a real environment or create an imaginary setting, thus a user can have a simulated experience of a physical presence in a three-dimensional environment.

SUMMARY

Aspects of the disclosure provide methods and apparatuses for video processing. In some examples, an apparatus for video processing includes processing circuitry. For example, processing circuitry determines a frame interval for a current block in a current frame. The current frame is a frame within a sequence of frames, and the frame interval indicates a group of frames in the sequence of frames with collocated blocks of the current block that satisfy an error metric requirement comparing to the current block. Further, the processing circuitry determines a replacement block based on the collocated blocks in the group of frames, and replaces the current block in the current frame with the replacement block.

In some embodiments, the processing circuitry determines a starting frame prior to the current frame. Collocated blocks of the current block in the staring frame and frames between the starting frame and the current frame satisfy the error metric requirement comparing to the current block.

In some embodiments, the processing circuitry determines an ending frame after the current frame. Collocated blocks of the current block in the ending frame and frames between the current frame and the ending frame satisfy the error metric requirement comparing to the current block.

In some examples, the processing circuitry partitions the current block into smaller blocks in response to the frame interval being smaller a predefined threshold, and a size of the smaller blocks satisfying a size requirement.

In some embodiments, a top-down block decomposition is used. For example, the processing circuitry partitions the current frame into maximum blocks that satisfy a maximum size requirement, and recursively partitions each of the maximum blocks based on a frame interval requirement and a minimum size requirement.

In some embodiments, a bottom-up block decomposition is used. For example, the processing circuitry partitions the current frame into minimum blocks that satisfy a minimum size requirement, and recursively combines neighboring minimum blocks based on a frame interval requirement and a maximum size requirement.

In some examples, the error metric requirement includes a first requirement for an error between the current block and each of the collocated blocks, and a second requirement for a combined error of the collocated blocks to the current block. The error is calculated as at least one of a sum of absolute difference, a mean square error and a weighted difference by pixels.

In some embodiments, the processing circuitry filters the collocated blocks to determine the replacement block. The processing circuitry can filter the collocated blocks using at least one of a mean filter, a median filter, and a Gaussian filter.

Aspects of the disclosure also provide a non-transitory computer-readable medium storing instructions which when executed by a computer for video processing cause the computer to perform the method for video processing.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Immersive videos are a portion of immersive media. Generally, immersive video includes video recordings where views in multiple directions are recorded at the same time, such as shot using an omnidirectional camera or a collection of cameras. Further, in some examples, during playback on a display (such as a flat display), the viewer has control of the viewing direction like a panorama. The immersive video can be played on displays or projectors arranged in a sphere or some part of a sphere.

In some examples, coded representation of immersive video can support 3 degrees of freedom (3 DoF). For example, a viewer's position is static, but the viewer's head can yaw, pitch and roll. In some other examples, coded representation of immersive video can support 6 degrees of freedom (6 DoF). In addition to the 3 DoF orientations (e.g., yaw, pitch and roll), the 6 DoF enables translational movements in horizontal, vertical, and depth directions. The support of translational movements enables interactive motion parallax that can provide a viewer with natural cues to the viewer's visual system and can result in an enhanced perception of spatial volume around the viewer.

According to an aspect of the disclosure, for a given viewpoint's location and pose, images of synthesized view can be generated, for example, using view synthesis software and/or hardware. The synthesized view may exhibit temporal noises, especially for static background. For example, in the "basketball" test sequence, the basketball stands, lines (half-court line, 3-point line, and free throw line, etc.) may exhibit severe temporal noises, such as moving back and forth, vibrating, and the like, in the synthesized view. The temporal noise can be disturbing to the viewer. The present disclosure provides techniques for block-based temporal smoothing of video that can perform temporal denoising, and improve viewer perceptual quality. In some embodiments, when temporal denoising of video is performed before video encoding, the video compression speed and effectiveness can be improved, and video transmission bandwidth can be reduced.

Figure 1:
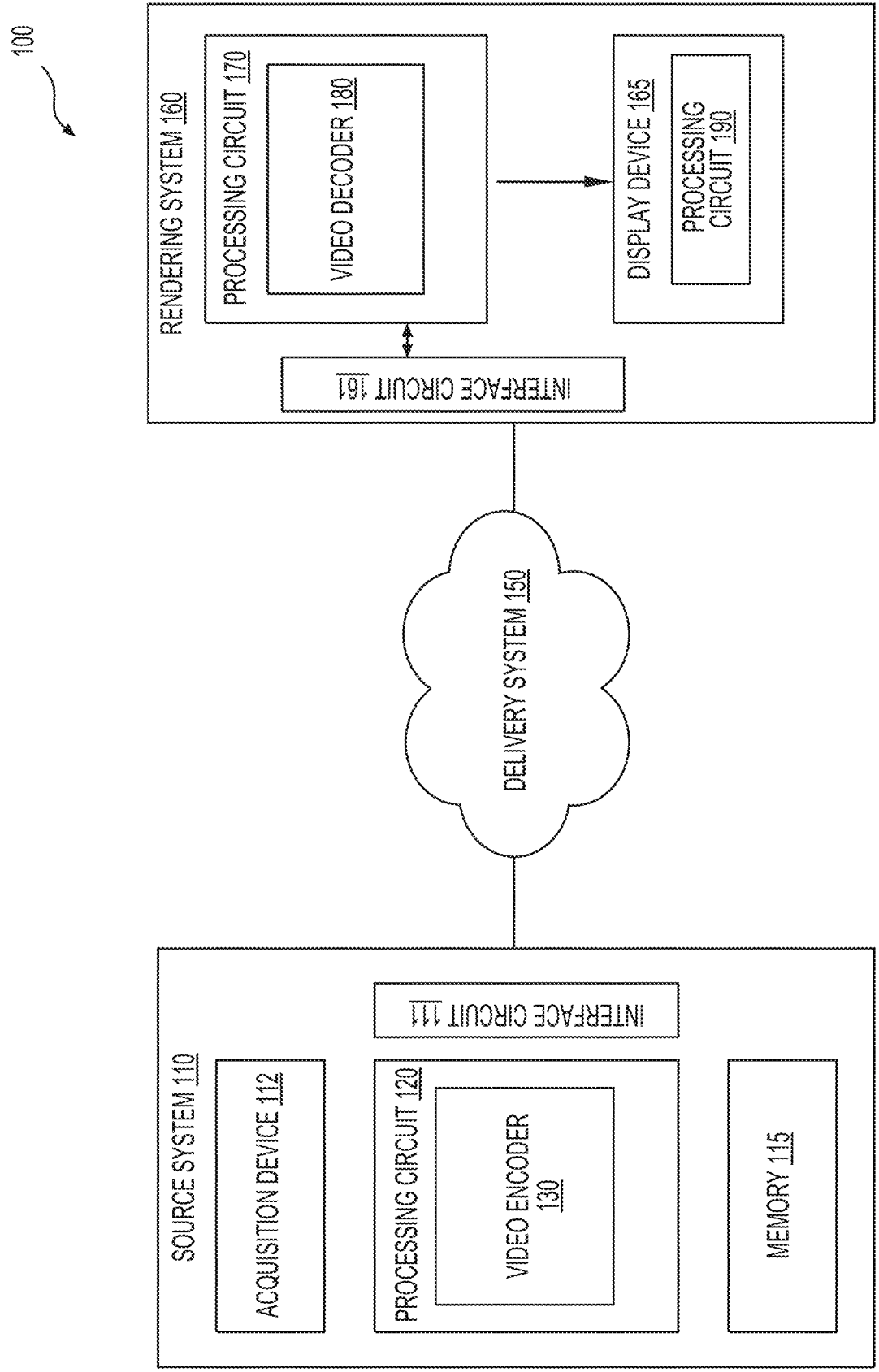
FIG. 1 shows a block diagram of a video system 100 according to an embodiment of the disclosure.

FIG. 1 shows a block diagram of a video system 100 according to an embodiment of the disclosure. The video system 100 includes a source system 110, a delivery system 150 and a rendering system 160 coupled together. The source system 110 is configured to acquire visual images for a video, and encode the visual images, for example into a coded video bitstream. The delivery system 150 is configured to deliver the coded video bitstream from the source system 110 to the rendering system 160. The rendering system 160 is configured to decode and reconstruct visual images from the coded video bitstream, and render the reconstructed visual images.

The source system 110 can be implemented using any suitable technology. In an example, components of the source system 110 are assembled in a device package. In another example, the source system 110 is a distributed system, components of the source system 110 can be arranged at different locations, and are suitably coupled together for example by wire connections and/or wireless connections.

In the FIG. 1 example, the source system 100 includes an acquisition device 112, a processing circuit (e.g., an image processing circuit) 120, a memory 115, and an interface circuit 111 coupled together.

The acquisition device 112 is configured to acquire video in the form of a sequence of picture frames. The acquisition device 112 can have any suitable settings. In an example, the acquisition device 112 includes a camera rig (not shown) with multiple cameras, such as an imaging system with two fisheye cameras, a tetrahedral imaging system with four cameras, a cubic imaging system with six cameras, an octahedral imaging system with eight cameras, an icosahedral imaging system with twenty cameras, and the like, configured to take images of various directions in a surrounding space.

In an embodiment, the images from the multiple cameras can be stitched into a three dimensional (3D) picture to provide a larger coverage of the surrounding space than a single camera. In an example, the images taken by the cameras can provide a 3D picture of 360° sphere coverage of the whole surrounding space. It is noted that the images taken by the cameras can provide a picture of less than 360° sphere coverage of the surrounding space. In an example, 3D pictures taken sequentially in time can form an immersive video.

In some embodiments, the images acquired by the acquisition device 112 can be suitably stored or buffered, for example in the memory 115. The processing circuit 120 can access the memory 115 and process the images. In some examples, the processing circuit 120 is configured based on virtual camera synthesis technologies, and can generate synthesized view for a given viewpoint's location and pose. In an example, according to the images acquired by the acquisition device 112 and stored in the memory 115, the processing circuit 120 can generate a video (e.g., a sequence of images) for a viewpoint. Further, in some examples, the processing circuit 120 includes a video encoder 130 that can encode the video and generate a coded video bitstream that carries the encoded video.

In an embodiment, the processing circuit 120 is implemented using one or more processors, and the one or more processors are configured to execute software instructions to perform media data processing. In another embodiment, the processing circuit 120 is implemented using integrated circuits.

In the FIG. 1 example, the coded video bitstream can be provided to the delivery, system 150 via the interface circuit 111. The delivery system 150 is configured to suitably provide coded video bitstream to client devices, such as the rendering system 160. In an embodiment, the delivery system 150 can include servers, storage devices, network devices and the like. The components of the delivery system 150 are suitably coupled together via wired and/or wireless connections. The delivery system 150 is suitably coupled with the source system 110 and the rendering system 160 via wired and/or wireless connections.

The rendering system 160 can be implemented using any suitable technology. In an example, components of the rendering system 160 are assembled in a device package. In another example, the rendering system 160 is a distributed system, components of the source system 110 can be located at different locations, and are suitable coupled together by wire connections and/or wireless connections.

In the FIG. 1 example, the rendering system 160 includes an interface circuit 161, a processing circuit 170 and a display device 165 coupled together. The interface circuit 161 is configured to suitably receive a coded video bitstream corresponding to a sequence of images for a video.

In an embodiment, the processing circuit 170 is configured to process the coded video bitstream and reconstruct a sequence of images for the display device 165 to present to one or more users. For example, the processing circuit 170 includes a video decoder 180 that can decode information in the coded video bitstream and reconstruct the sequence of images.

The display device 165 can be any suitable display, such as a television, a smart phone, a wearable display, a head-mounted device, and the like. In an example, the display, device 165 can receive a sequence of images and suitably display the sequence of images. In some examples, the display device 165 includes a processing circuit 190 that is configured to process the received images to generate final images for displaying.

Aspects of the disclosure provide techniques for temporal denoising of videos. The techniques for temporal denoising of videos can be applied to video by various components in the video system 100, such as the processing circuit 120, the processing circuit 170, the processing circuit 190 and the like. In an example, the processing circuit 120 can apply the techniques for temporal denoising of a video before encoding the video into the coded video bitstream by the video encoder 130. In another example, the processing circuit 170 can apply the techniques for temporal denoising of a video after the decoding of the coded video bitstream by the video decoder 180. In another example, the processing circuit 190 can apply the techniques for temporal denoising of a video before generating final images for displaying.

The techniques for temporal denoising of video are based on adaptive, block-based temporal smoothing. In some embodiments, a video can be decomposed into a set of 2-D time dependent blocks. The decomposition of video into 2-D blocks can be achieved through a recursive block partition scheme. Further, in some embodiments, for each block, temporal smoothing intervals can be established from the set, and the noise can be removed based on the temporal smoothing intervals.

The techniques for temporal denoising of video include first techniques for block decomposition, and second techniques for temporal smoothing. The first techniques can decompose a video into 2-D blocks, and search in the temporal direction for corresponding blocks that satisfy a defined metric. The second techniques can apply temporal smoothing based on the search results to achieve denoising.

It is noted that while the following description processes video at frame level, the disclosed techniques can be employed at field level, or a combination of frame level and field level. It is also noted that techniques disclosed in the present disclosure may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

According to some aspects of the disclosure, block decomposition techniques can decompose each frame in an input video into 2-D blocks. In some examples, each frame in the input video has a size of W×H, where W and H are the width and height, respectively. In some embodiments, the size of a 2-D block can be determined through a deterministic scheme by examining frames (in display order) prior to the current frame and those after the current frame. The size of the 2-D block is also limited by a maximum allowed block size $BS_{max}$, and a minimum allowed block size $BS_{min}$. The maximum allowed block size $BS_{max}$ and the minimum allowed block size $BS_{min}$ can be any suitable number. In an example, $BS_{max}$ is equal to 64 and $BS_{min}$ is equal to 8 for a 1080p (1920×1080 pixels) video content. In another example, $BS_{max}$ is equal to 64 and $BS_{min}$ is equal to 4 for a 1080p (1920×1080 pixels) video content.

The block decomposition can be accomplished by a top-down approach or a bottom-up approach.

According to an aspect of the disclosure, the top-down approach first partitions each frame into non-overlapping 2-D blocks of size $BS_{max} \times BS_{max}$. Further, for each block of size $BS_{max} \times BS_{max}$, a recursive scheme is applied to determine whether to decompose a larger block into four blocks of half size (in both horizontal and vertical directions).

To apply the recursive scheme on a block, a search in a temporal direction or temporal directions can be performed to determine corresponding blocks in other frames that satisfy a defined metric. Specifically, in some examples, for a current block of size M×M in a current frame, frames (in display order) prior to the current frame and/or frames after the current frame are searched to compute a smoothing interval length sil (also referred to as frame interval), for the current block. The computation of smoothing interval length will be described in detail with reference to FIG. 4.

Figure 2:
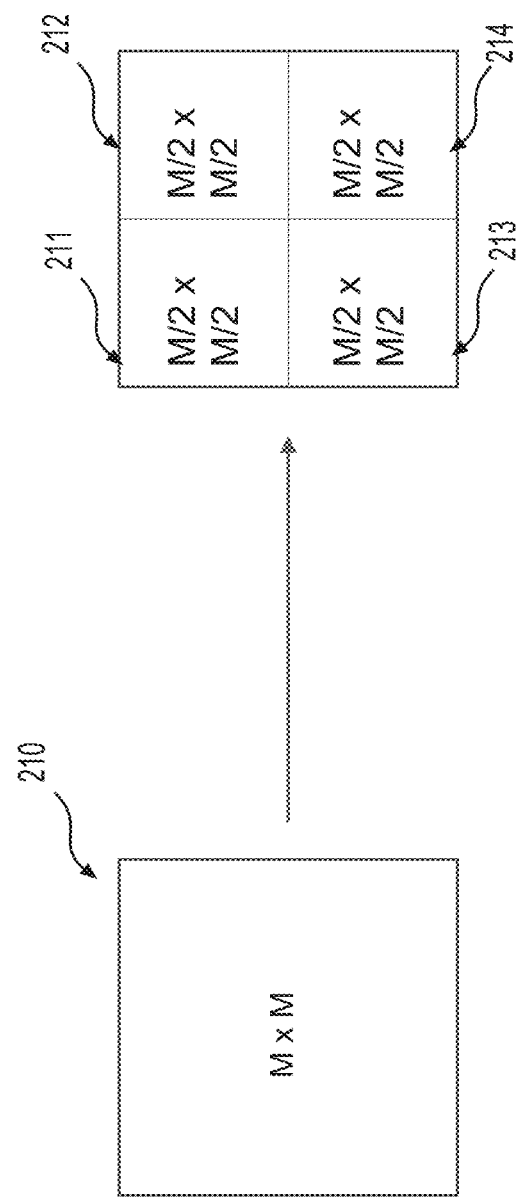
FIG. 2 shows a diagram of block partition according to some embodiments of the disclosure.

FIG. 2 shows a diagram of block partition according to some embodiments of the disclosure. As shown in FIG. 2, a current block (210) has a size M×M. To apply the recursive scheme applied on the current block, if M/2 is less than $BS_{min}$, the block decomposition is complete for the current block (210); otherwise, if the smoothing interval length value sil is larger than or equal to a threshold that is referred to as a smooth interval threshold silTh, the block decomposition is complete for the current block (210). For the current block (210), if the smoothing interval length value sil is less than the smooth interval threshold silTh, and M/2 is larger than or equal to $BS_{min}$, the current block (210), can be decomposed into 4 blocks (211)-(214) of size M/2×M/2 as shown in FIG. 2.

In the top-down approach, recursive decomposition starts with blocks of block size $BS_{max} \times BS_{max}$. After all blocks run through recursive decomposition (either the smoothing interval length value sil is larger than or equal to the smooth interval threshold silTh, or the block size reaches the minimum allowed block size $BS_{min} \times BS_{min}$), the block decomposition is complete.

Figure 3:
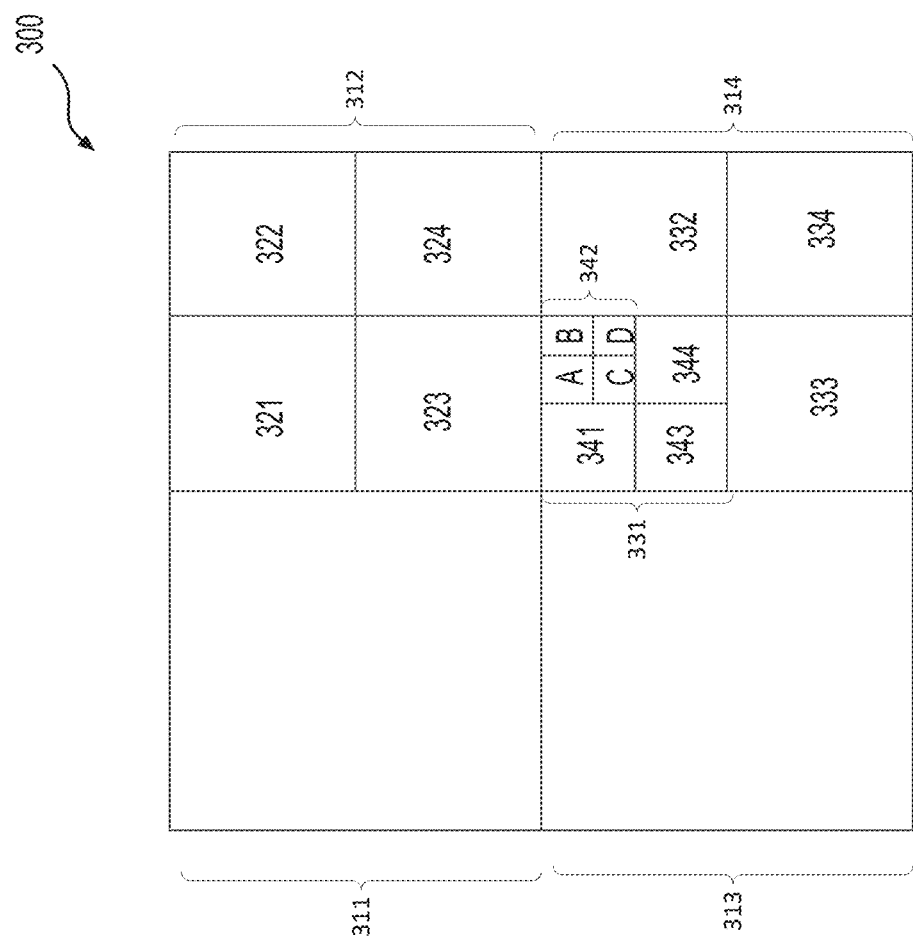
FIG. 3 shows an example of block decomposition according to an embodiment of the disclosure.

FIG. 3 shows an example of block decomposition according to an embodiment of the disclosure. In the FIG. 3 example, a frame (300) is decomposed into blocks of various sizes. In the FIG. 3 example, $BS_{max}$ is equal to 64 and $BS_{min}$ is equal to 8. Using the top down approach as an example, the frame (300) is partitioned into blocks (311)-(314) that each has a size of 64×64.

For the block (311), a search in the temporal direction(s) is performed to compute a smoothing interval length sil for the block (311). The smoothing interval length sil is larger than or equal to the smooth interval threshold silTh, thus decomposition of the block (311) is complete.

For the block (312), a search in the temporal direction(s) is performed to compute a smoothing interval length sil for the block (312). The smoothing interval length sil is smaller than the smooth interval threshold silTh, and 64/2 is larger than $BS_{min}$, thus the block (312) is partitioned into blocks (321)-(324).

In an example, for each of the blocks (321)-(324), a search in the temporal direction(s) is performed to compute a smoothing interval length sil. For each of the blocks (321)-(324), the smoothing interval length sil is larger than or equal to the smooth interval threshold silTh, thus decomposition for each of the blocks (321)-(324), is complete.

For the block (313), a search in the temporal direction(s) is performed to compute a smoothing interval length sil for the block (313). The smoothing interval length sil is larger than or equal to the smooth interval threshold silTh, thus decomposition of the block (313) is complete.

For the block (314), a search in the temporal direction(s) is performed to compute a smoothing interval length sil for the block (314). The smoothing interval length sil is smaller than the smooth interval threshold silTh, and 64/2 is larger than $BS_{min}$ thus the block (314) is partitioned into blocks (331)-(334).

For the block (331), a search in the temporal direction(s) is performed to compute a smoothing interval length sil for the block (331). The smoothing interval length sil is smaller than the smooth interval threshold silTh, and 32/2 is larger than $BS_{min}$, thus the block (331) is partitioned into blocks (341)-(344).

In an example, for each of the blocks (341), (343) and (344), a search in the temporal direction(s) is performed to compute a smoothing interval length sil. For each of the blocks (341), (343) and (344), the smoothing interval length sil is larger than or equal to the smooth interval threshold silTh, thus decomposition for each of the blocks (341), (343) and (344), is complete.

For the block (342), a search in the temporal direction(s) is performed to compute a smoothing interval length sil for the block (342). The smoothing interval length sil is smaller to the smooth interval threshold silTh, and 16/2 is equal to $BS_{min}$, thus the block (342) is partitioned into blocks (A)-(D). Because the blocks (A)-(D) have the minimum allowed block size, and thus are not decomposed anymore.

In an example, for each of the blocks (332)-(334), a search in the temporal direction(s) is performed to compute a smoothing interval length sit. For each of the blocks the blocks (332)-(334), the smoothing interval length sil is larger than or equal to the smooth interval threshold silTh, thus decomposition for each of the blocks the blocks (332)-(334), is complete.

Figure 4:
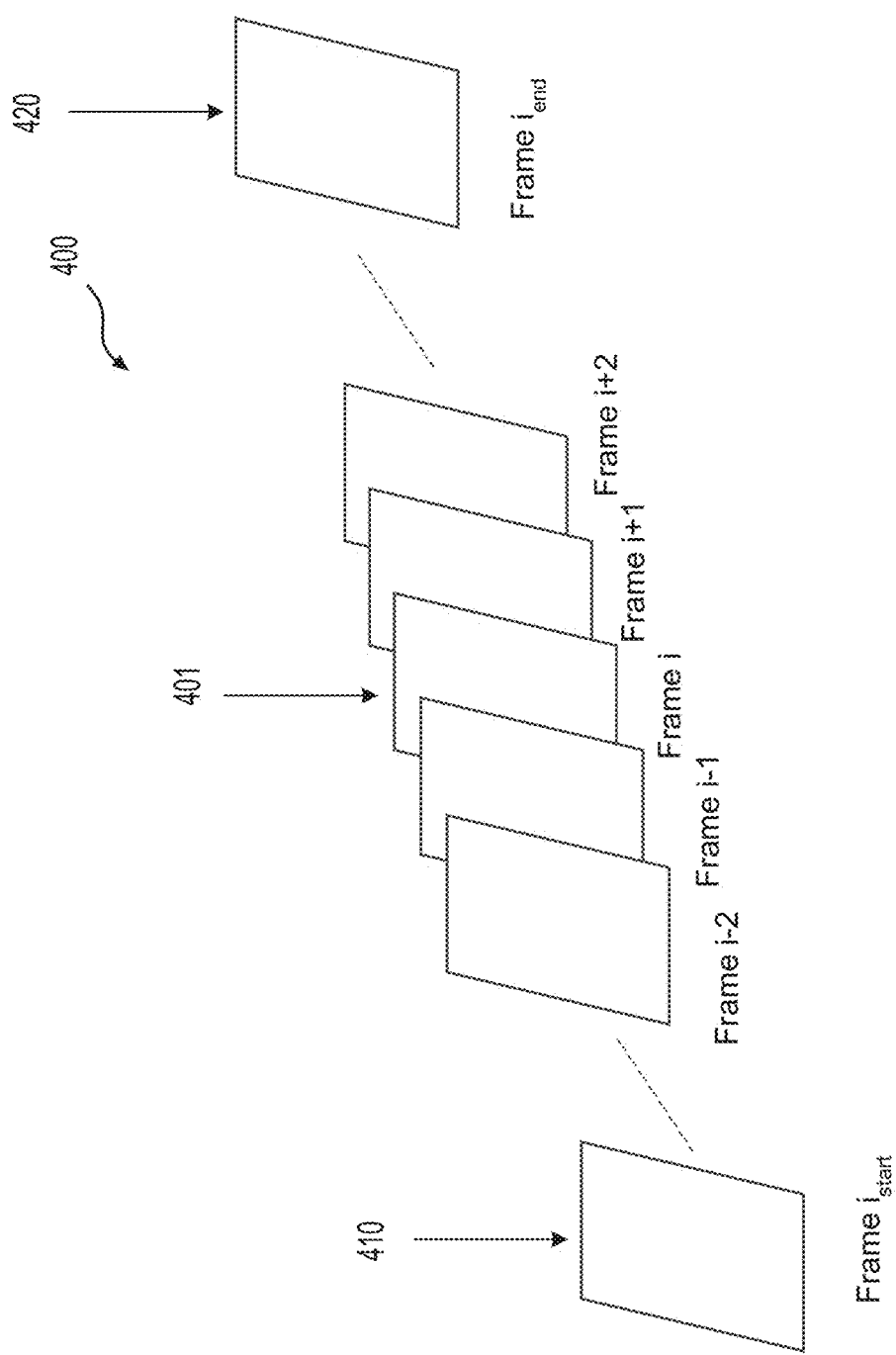
FIG. 4 shows an example to illustrate a computation of the smoothing interval length according to some embodiments of the disclosure.

FIG. 4 shows an example to illustrate a computation of the smoothing interval length according to some embodiments of the disclosure.

In some embodiments, to compute the smoothing interval length for a given block in a current frame (401), a search is performed to find a start frame (410) and/or an end frame (420). Then based on the frames from the start frame (410) to the end frame (420), temporal smoothing can be performed for the given block. In an embodiment, the start frame (410) and the end frame (420) can be determined by a double thresholding algorithm.

In a related example, the double thresholding algorithm is performed for pixel-wise temporal averaging in video denoising. In the present disclosure, a block-based temporal smoothing, which adds a pooling advantage over the pixel-wise approach can be performed.

For example, assuming that the current frame (401) has a frame index i, the frame index of the start frame (410) is determined using an iterative scheme, by computing an error metric between the current block and collocated blocks (blocks of the same size as the current block and same coordinates as the current block in the respectively frames) in frames prior to the current frame (401), and using a direct error threshold deTh, and an accumulative error threshold aeTh. In some examples, both of the direct error threshold deTh and the accumulative error threshold aeTh are functions of the block size of the current block (401), for example M×M. In an embodiment, the direct error threshold deTh and the accumulative error threshold aeTh can be set to be constant scalars of the block size. For example, if the pixel value is represented as a 10-bit integer, the direct error threshold deTh can be set to $2.5 \times M^2$, and the accumulative error threshold aeTh can be set to $5.0 \times M^2$.

The error metric (denoted by EB) between two blocks can be calculated by any suitable metric that measures the difference between two blocks of the same size and location. In an example, the error metric EB between two blocks is calculated as a sum of absolute difference of collocated (e.g., same horizontal position and same vertical position) pixels of the two blocks. In another example, the error metric EB between two blocks is calculated as a sum of mean square error of collocated (e.g., same horizontal position and same vertical position) pixels in the two blocks. In another example, the error metric EB between two blocks is calculated as a sum of a weighted difference of collocated (e.g., same horizontal position and same vertical position) pixels of the two blocks.

In an embodiment, the error metric EB can be computed by summing over all color channels (such as, YUV, RGB, HSV, etc.). In another embodiment, the error metric EB can be computed for one or a few color channels.

In an example, the error metric EB is calculated as the sum of absolute difference of the Y channel of two blocks of the same coordinates in plane of frame. For example, the current block (401) is in frame i and other block is in frame j, the error metric EB is calculated using (Eq. 1):

$$EB = \Sum_{l<x<r, t<y<b} |Y_{i,x,y} - Y_{j,x,y}| \quad \text{(Eq. 1)}$$

Where $Y_{i,x,y}$ is the luminance (Y channel) value of the pixel located at the coordinate (x,y) in frame i, and $Y_{j,x,y}$ is the luminance (Y channel) value of the pixel located at the same coordinate (x,y) in frame j. The location (l+1, t+1) is the top-left vertex (coordinate) of the current block in frame i and the collocated block in frame j, and (r−1, b−1) is the bottom-right vertex (coordinate) of the current block in frame I and the collocated block in frame j.

In an embodiment, for a given block in the current frame (401), a search is performed in a video using a search algorithm to find a start frame (410) before the current frame (401). Assuming the video starts with frame 0, the current frame is the frame i, and the search algorithm determines a start frame $i_{start}$ according to the following steps;

1. set k=i−1, search=true, Sum_err=0
2. if (k>=0) and (Search=True)
    a. Compute the error (EB) between the current block and the block of frame k at the same spatial location
    b. If (EB>deTh) Search=False, the search stops
    c. Sum_err=Sum_err+EB
    d. If (Sum_err>aeTh) Search=False, and search stops
    e. k=k−1
    f. go back to 2.
3. set $i_{start}$=k+1

In an embodiment, for a given block in the current frame (401), another search is performed in a video using a similar search algorithm to find an end frame (420) with a frame index $i_{end}$ after the current frame (401).

In an embodiment, a first search to find the start frame (410) is performed and a second search to find the end frame (420) is performed, and the smooth interval length is calculated as a difference between $i_{end}$ and $i_{start}$.

In another embodiment, a search algorithm to find a start frame (410) before the current frame (401) is performed, and the smooth interval length is calculated as a difference between i and $i_{start}$.

In another embodiment, a search algorithm to find an end frame (420) after the current frame (401) is performed, and the smooth interval length is calculated as a difference between $i_{end}$ and i.

According to an aspect of the disclosure, a bottom-up approach can be used for block partition. In the bottom-up approach, the block decomposition starts with the smallest block of a size $BS_{min} \times BS_{min}$. For example, a frame is decomposed into non-overlapping blocks with the size $BS_{min} \times BS_{min}$. Then, a recursive algorithm can be performed to combine four neighboring blocks based on thresholding the smoothing interval length value of the larger block in a similar manner as the top-down approach.

In some embodiments, for each block decomposed in a current frame, after the start frame index (e.g., $i_{start}$) and/or the end frame index (e.g., $i_{end}$) are determined, temporal smoothing for the block can be performed to reduce temporal noise.

In an embodiment, for a current block in the current frame (frame index i), temporal smoothing is performed based on frames from the start frame index to the end frame index to reduce temporal noise.

In some examples, for a current block (e.g., decomposed 2-D block) in the current frame, if the smooth interval length (e.g., $i_{end}-i_{start}$) is larger than or equal to the smooth interval threshold silTh, a temporal smoothing filter is applied on a 3-dimension volume that includes 2-D blocks from frame index $i_{start}$ to frame index $i_{end}$, with the same spatial location with the current block. In an example, the current block of the current frame is included in the 3-dimension volume; in another example, the current block of the current frame is excluded from the 3-dimension volume. The temporal smoothing filter can be any suitable filter, such as a mean filter, a median filter, a Gaussian filter, and the like. The filtering result is used to replace the current block in the current frame. It is noted that, in some examples, only pixel values of the current block are changed in the filtering and replacing step, while the 2D blocks prior to the current frame and after the current frame will remain unchanged.

In some examples, for a current block in the current frame, if the smooth interval length (e.g., $i_{end}-i_{start}$), is less than the smooth interval threshold silTh, no temporal smoothing filter will be applied to the current block.

In some examples, after pixel values of a 2-D block are replaced with temporal smoothing, if the 2-D block is selected for temporal smoothing of another block (e.g. at a future frame), the original pixel values (the ones before temporal smoothing) of the 2-D) block will be used for the other block's temporal smoothing. In some other examples, after pixel values of a 2-D block are replaced with temporal smoothing, if the 2-D block is selected for temporal smoothing of another block (e.g. at a future frame), the replaced pixel values (the ones after temporal smoothing) of the 2-D block will be used for the other block's temporal smoothing.

While the above temporal smoothing techniques are based on frames from the start frame index to the end frame index to reduce temporal noise, in some embodiments, the temporal smoothing techniques are modified to be based on frames from the start frame index to the current frame index. In some other embodiments, the temporal smoothing techniques are modified to be based on frames from the current frame index to the end frame index.

Figure 5:
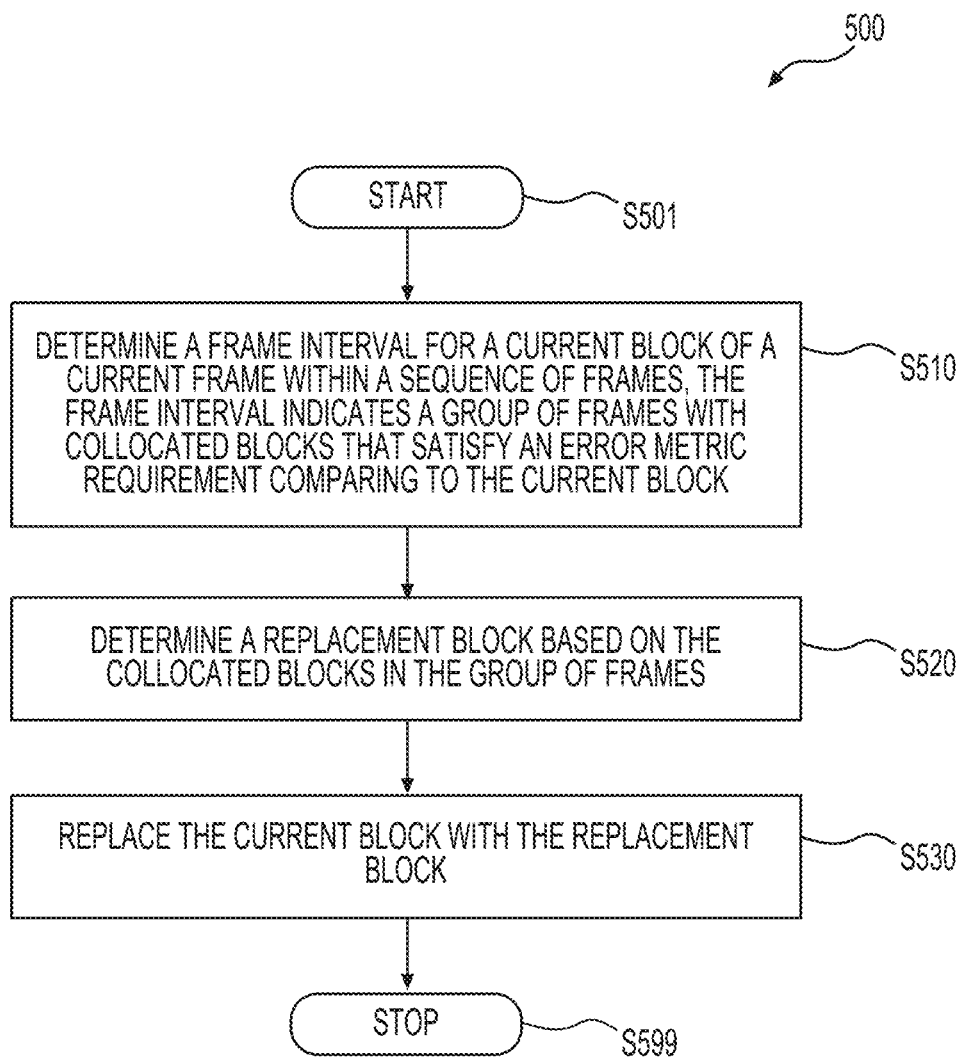
FIG. 5 shows a flow chart outlining a process example according to an embodiment of the disclosure.

FIG. 5 shows a flow chart outlining a process (500) according to an embodiment of the disclosure. The process (500) can be used to remove temporal noise in a video. In various embodiments, the process (500) is executed by processing circuitry, such as the processing circuit (120), the processing circuit (170), the processing circuit (190) and the like. In an example, the process (500) is executed by the processing circuit (120) before the video encoder (130) encodes a sequence of frames in a video. In another example, the process (500) is executed by the processing circuit (170) after the video decoder (180) reconstructs a sequence of frames of a video from a coded video bitstream. In another example, the process (500) is executed by the processing circuit (190) before final images to display are generated. In some embodiments, the process (500) is implemented in software instructions, thus when the processing circuitry executes the software instructions, the processing circuitry performs the process (500). The process starts at (S501) and proceeds to (S510).

At (S510), a frame interval (e.g., smooth interval length) for a current block of a current frame is determined. The current frame is a frame within a sequence of frames. The frame interval indicates a group of frames in the sequence of frames with collocated blocks of the current block that satisfy an error metric requirement (e.g., smaller than direct error threshold deTh, smaller than accumulative error threshold aeTh) comparing to the current block.

In an embodiment, a starting frame prior to the current frame is determined. The collocated blocks of the current block in the staring frame and frames between the starting frame and the current frame satisfy the error metric requirement comparing to the current block. Further, an ending frame after the current frame is determined. The collocated blocks of the current block in the ending frame and frames between the current frame and the ending frame satisfy the error metric requirement comparing to the current block.

In some embodiments, the current block can be partitioned into smaller blocks in response to the frame interval being smaller a predefined threshold, and a size of the smaller blocks satisfying a size requirement.

In some embodiments, a top-down block decomposition can be used. For example, the current frame is partitioned into maximum blocks that satisfy a maximum size requirement (e.g., width and height are respectively equal to maximum allowed block size $BS_{max}$). Then, each of the maximum blocks is recursively partitioned based on a frame interval requirement (e.g., smoothing interval length sil is required to be larger than smooth interval threshold silTh) and a minimum size requirement (e.g., the minimum allowed block size is $BS_{min}$).

In some embodiments, a bottom-up block decomposition can be used. For example, the current frame is partitioned into minimum blocks that satisfy a minimum size requirement. Then, neighboring minimum blocks are recursively combined based on a frame interval requirement and a maximum size requirement.

In some embodiments, the error metric requirement includes a first requirement (e.g., an error between each collocated block and the current block is smaller than direct error threshold deTh) and a second requirement for a combined error of the collocated blocks to the current block (e.g., a combined error of the collocated blocks to the current block is smaller than accumulative error threshold aeTh). The error can be calculated as a SUM of absolute difference, a mean square error or a weighted difference by pixels.

At (S520), a replacement block is determined based on the collocated blocks in the group of frames. In an example, the collocated blocks in the frames within the frame interval are filtered to determine the replacement block. Various filters can be used, such as a mean filter, a median filter, and a Gaussian filter.

At (S530), the current block in the current frame is replaced by the replacement block. Then, the process proceeds to (S599) and terminates.

It is noted that the process (500) can be suitably executed for each block in the current frame. In some embodiments, when the frame interval is smaller than the smooth interval threshold silTh, the calculation of the replacement block is skipped.

The techniques described above, can be implemented as computer software using computer-readable instructions and physically stored in one or more computer-readable media. For example, FIG. 6 shows a computer system (600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
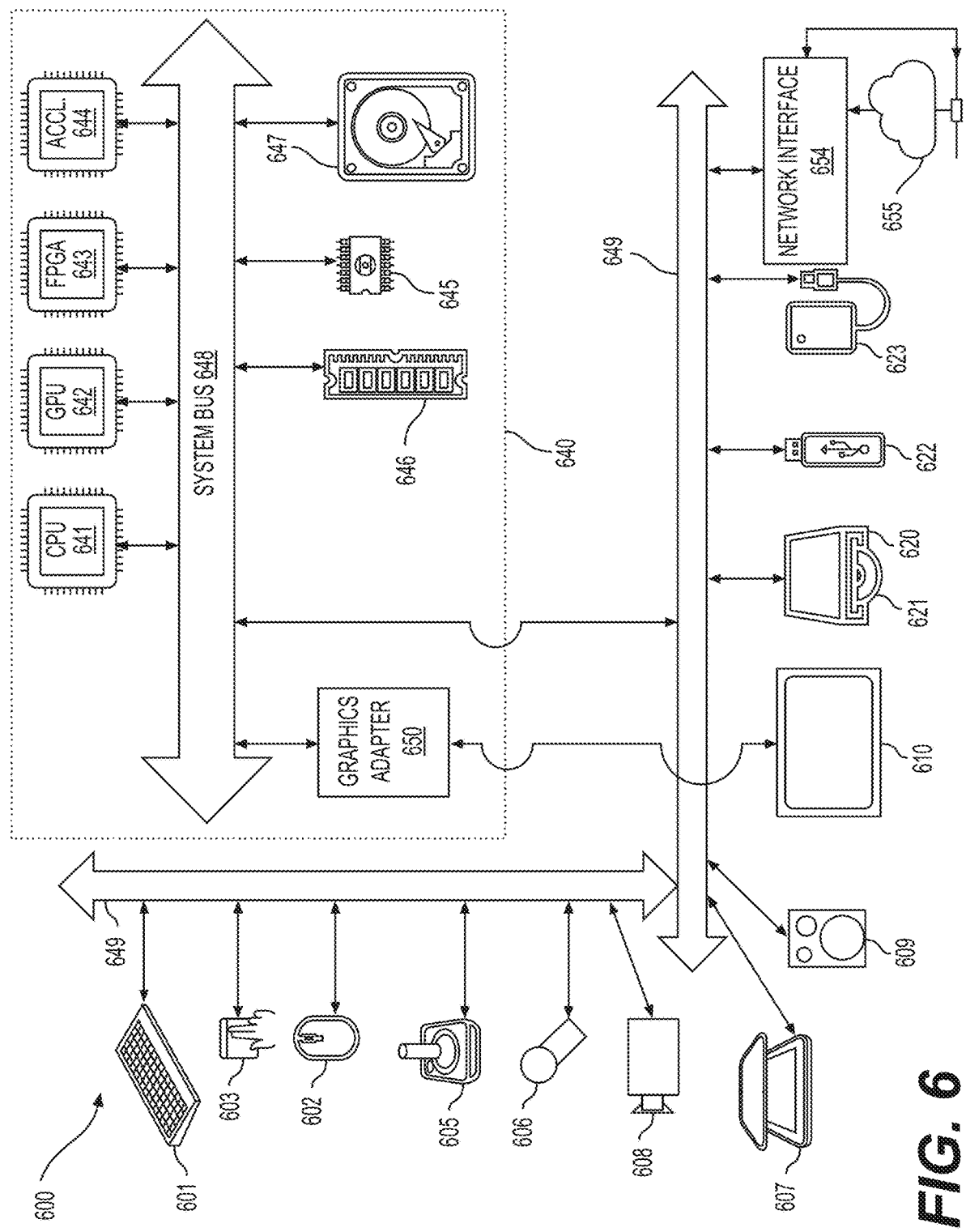
FIG. 6 is a schematic illustration of a computer system in accordance with an embodiment.

The components shown in FIG. 6 for computer system (600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (600).

Computer system (600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (601), mouse (602), trackpad (603), touch screen (610), data-glove (not shown), joystick (605), microphone (606), scanner (607), camera (608).

Computer system (600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (610), data-glove (not shown), or joystick (605), but there can also be tactile feedback devices that do not serve as input devices), audio output devices (such as: speakers (609), headphones (not depicted)), visual output devices (such as screens (610) to include CRT screens, LCD screens, plasma screens, OLED screens, each with or without touch-screen input capability, each with or without tactile feedback capability some of which may be capable to output two dimensional visual output or more than three dimensional output through means such as stereographic output; virtual-reality glasses (not depicted), holographic displays and smoke tanks (not depicted)), and printers (not depicted).

Computer system (600) can also include human accessible storage devices and their associated media such as optical media including CD/DVD ROM/RW (620) with CD/DVD or the like media (621), thumb-drive (622), removable hard drive or solid state drive (623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (600) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example USB ports of the computer system (600)); others are commonly integrated into the core of the computer system (600) by attachment to a system bus as described below (for example Ethernet interface into a PC computer system or cellular network interface into a smartphone computer system). Using any of these networks, computer system (600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (640) of the computer system (600).

The core (640) can include one or more Central Processing Units (CPU) (641), Graphics Processing Units (GPU) (642), specialized programmable processing units in the form of Field Programmable Gate Areas (FPGA) (643), hardware accelerators for certain tasks (644), and so forth. These devices, along with Read-only memory (ROM) (645), Random-access memory (646), internal mass storage such as internal non-user accessible hard drives, SSDs, and the like (647), may be connected through a system bus (648). In some computer systems, the system bus (648) can be accessible in the form of one or more physical plugs to enable extensions by additional CPUs. GPU, and the like. The peripheral devices can be attached either directly to the core's system bus (648), or through a peripheral bus (649). Architectures for a peripheral bus include PCI, USB, and the like.

CPUs (641), GPUs (642), FPGAs (643), and accelerators (644) can execute certain instructions that, in combination, can make up the aforementioned computer code. That computer code can be stored in ROM (645) or RAM (646). Transitional data can be also be stored in RAM (646), whereas permanent data can be stored for example, in the internal mass storage (647). Fast storage and retrieve to any of the memory devices can be enabled through the use of cache memory, that can be closely associated with one or more CPU (641), GPU (642), mass storage (647), ROM (645), RAM (646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (600), and specifically the core (640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (640) that are of non-transitory nature, such as core-internal mass storage (647) or ROM (645). The software implementing various embodiments of the present disclosure can be stored in such devices and executed by core (640). A computer-readable medium can include one or more memory devices or chips, according to particular needs. The software can cause the core (640) and specifically the processors therein (including CPU, GPU, FPGA, and the like) to execute particular processes or particular parts of particular processes described herein, including defining data structures stored in RAM (646) and modifying such data structures according to the processes defined by the software. In addition or as an alternative, the computer system can provide functionality as a result of logic hardwired or otherwise embodied in a circuit (for example: accelerator (644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SET: Supplementary Enhancement Information
VUI: Video Usability Information
GOPs: Groups of Pictures
TUs: Transform Units,
PUs: Prediction Units
CTU s: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area. Network Bus
USB: Universal Serial Bus
PCI: Peripheral Component Interconnect
FPGA: Field Programmable Gate Areas
SSD: solid-state drive
IC: Integrated. Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for video processing, comprising:
determining, by a processor, a frame interval for a current block in a current frame within a sequence of frames, the frame interval indicating a group of frames in the sequence of frames with collocated blocks of the current block that satisfy an error metric requirement comparing to the current block, wherein the error metric requirement includes a first requirement for an error between the current block and each of the collocated blocks, and a second requirement for a combined error of the collocated blocks to the current block;
determining, by the processor, a replacement block based on the collocated blocks in the group of frames;
partitioning, by the processor, the current block into minimum blocks that satisfy a minimum size requirement in response to the frame interval being smaller than a predefined threshold, and a size of the minimum blocks satisfying a size requirement;
recursively combining, neighboring minimum blocks based on a frame interval requirement and a maximum size requirement;
filtering, the collocated blocks to determine the replacement block; and
replacing, by the processor, the current block in the current frame with the replacement block.

2. The method of claim 1, further comprising:
determining, by the processor, a starting frame prior to the current frame, collocated blocks of the current block in the starting frame and frames between the starting frame and the current frame satisfying the error metric requirement comparing to the current block.

3. The method of claim 1, further comprising:
determining, by the processor, an ending frame after the current frame, collocated blocks of the current block in the ending frame and frames between the current frame and the ending frame satisfying the error metric requirement comparing to the current block.

4. The method of claim 1, further comprising:
partitioning, by the processor, the current frame into maximum blocks that satisfy the maximum size requirement; and
recursively partitioning, each of the maximum blocks based on the frame interval requirement and the minimum size requirement.

5. The method of claim 1, wherein the error is calculated as at least one of a sum of absolute difference, a mean square error and a weighted difference by pixels.

6. The method of claim 1, further comprising:
filtering, the collocated blocks using at least one of a mean filter, a median filter, and a Gaussian filter.

7. An apparatus for video processing, comprising:
processing circuitry configured to:
determine a frame interval for a current block in a current frame within a sequence of frames, the frame interval indicating a group of frames in the sequence of frames with collocated blocks of the current block that satisfy an error metric requirement comparing to the current block, wherein the error metric requirement includes a first requirement for an error between the current block and each of the collocated blocks, and a second requirement for a combined error of the collocated blocks to the current block;

determine a replacement block based on the collocated blocks in the group of frames;

partition the current block into minimum blocks that satisfy a minimum size requirement in response to the frame interval being smaller than a predefined threshold, and a size of the minimum blocks satisfying a size requirement;

recursively combine neighboring minimum blocks based on a frame interval requirement and a maximum size requirement;

filter the collocated blocks to determine the replacement block; and replace the current block in the current frame with the replacement block.

8. The apparatus of claim 7, wherein the processing circuitry is configured to:

determine a starting frame prior to the current frame, collocated blocks of the current block in the starting frame and frames between the starting frame and the current frame satisfying the error metric requirement comparing to the current block.

9. The apparatus of claim 7, wherein the processing circuitry is configured to:

determine an ending frame after the current frame, collocated blocks of the current block in the ending frame and frames between the current frame and the ending frame satisfying the error metric requirement comparing to the current block.

10. The apparatus of claim 7, wherein the processing circuitry is configured to:

partition the current frame into maximum blocks that satisfy the maximum size requirement; and recursively partition each of the maximum blocks based on the frame interval requirement and the minimum size requirement.

11. The apparatus of claim 7, wherein the error is calculated as at least one of a sum of absolute difference, a mean square error and a weighted difference by pixels.

12. The apparatus of claim 7, wherein the processing circuitry is configured to:

filter the collocated blocks using at least one of a mean filter, a median filter, and a Gaussian filter.

\* \* \* \* \*